United States Patent [19]

Shiraki et al.

[11] Patent Number: 4,987,025

[45] Date of Patent: Jan. 22, 1991

[54] INFLATION FILM OF ULTRAHIGH MOLECULAR WEIGHT POLYETHYLENE

[75] Inventors: Takeshi Shiraki, Yamaguchi; Koji Nakashima, Hiroshima, both of Japan

[73] Assignee: Mitsui Petrochemical Industries, Ltd., Tokyo, Japan

[21] Appl. No.: 222,344

[22] Filed: Jul. 19, 1988

Related U.S. Application Data

[63] Continuation of Ser. No. 894,536, Aug. 8, 1986, abandoned.

[30] Foreign Application Priority Data

Aug. 12, 1985 [JP] Japan ................... 60-175792
Jul. 21, 1986 [JP] Japan ................... 61-169699

[51] Int. Cl.$^5$ ............................. C08F 10/02
[52] U.S. Cl. ..................... 428/220; 428/98; 428/910; 526/348.1; 526/352; 264/563; 264/177.17
[58] Field of Search ............. 526/348.1, 352; 264/563, 176 R; 428/98, 220, 910, 36, 911

[56] References Cited

U.S. PATENT DOCUMENTS 3,944,536  3/1976  Lupton et al. ............... 528/502 X
4,545,950 10/1985  Motooka et al. ........... 526/348.1 X

FOREIGN PATENT DOCUMENTS 59-227420 12/1984  Japan ...................... 526/352

OTHER PUBLICATIONS

Translation of Japanese Patent Application No. 1983-102713 to Yagi et al., laid open Dec. 20, 1984.
Schwartz et al., Plastics Materials and Processes, Van Nostrand Reinhold Co. Inc., N.Y., N.Y., 74, 1982.

*Primary Examiner*—Fred Teskin
*Attorney, Agent, or Firm*—Armstrong, Nikaido, Marmelstein, Kubovcik & Murray

[57] ABSTRACT

Disclosed are an inflation film of ultra-high-molecular-weight polyethylene having an intrinsic viscosity [$\eta$] of at least 5 dl/g, a tensile strength at break of at least 800 kg/cm$^2$ in a machine direction and at least 700 kg/cm$^2$ in a transverse direction, an impact strength of at least 5000 kg·cm/cm, a permeability to water vapor of 0.45 g·mm/m$^2$·24 hr or less, a shrinkage factor in a transverse direction at 130° C. of 10% or more, and a thickness of 10 to 1000 μm, and a method and apparatus for producing the same.

3 Claims, 1 Drawing Sheet

INFLATION FILM OF ULTRAHIGH MOLECULAR WEIGHT POLYETHYLENE

This application is a continuation of application Ser. No. 894,536 filed Aug. 8, 1986, now abandoned.

BACKGROUND OF THE INVENTION

1. Field of the Invention

The present invention relates to an inflation film of an ultra-high-molecular-weight polyethylene. The present invention also relates to a method and apparatus for producing an inflation film from an ultra-high-molecular-weight polyethylene.

2. Description of the Related Art

Ultra-high-molecular-weight polyethylene is increasingly used as a so-called engineering plastic because of its excellent impact resistance, abrasion resistance, chemical resistance, tensile strength, and other properties, when compared with conventional polyethylene. However, ultra-high-molecular-weight polyethylene has an extremely high melt viscosity and poor flowability when compared with conventional polyethylene, and thus it is very difficult to mold such a plastic by conventional extrusion molding (e.g., inflation molding) and injection molding. Accordingly, ultra-high-molecular-weight polyethylene is generally molded by compression molding; with the exception of rods and the like, which are partly extrusion molded at a very low extrusion speed.

It has been proposed in, for example, Japanese Examined Patent Publication (Kokoku) No. 48-11576, as a method for producing a film from an ultra-high-molecular-weight polyethylene that, after the ultra-high-molecular-weight polyethylene powder is sintered, the sintered powder be heated between two flat belts at a temperature higher than the melting point of the polyethylene, under pressure and followed by cooling. Alternatively, it has been proposed in, for example, Japanese Unexamined Patent Publication (Kokai) No. 53-45376 that a sintered ultra-high-molecular-weight polyethylene film be orientated at a temperature of the second-order transition temperature or more to a temperature of less than the melting point thereof by means of press rolls. Although the former method can provide films having good appearance, the production of thinner films is difficult because the melt viscosity of ultra-high-molecular-weight polyethylene is extremely large. Furthermore, the latter method has disadvantages in that, since the viscosity of ultra-high-molecular-weight polyethylene becomes larger at a temperature of less than the melting point, a desirable film cannot be obtained even when the polyethylene is rolled by a compression roller.

Although it seems obvious that, as a method for producing a thin film, the ultra-high-molecular-weight polyethylene can be stretched, the ultra-high-molecular-weight polyethylene alone cannot be stretched at all because the molecular weight thereof is very large. Also, although it appears obvious to heat the polyethylene to the melting point thereof or more during the stretching, in general, this increases the stickness of the crystalline polyolefin and decreases the melt viscosity thereof, upon heating to the melting point thereof or more, so that the rolling becomes difficult. Accordingly, as pointed out in the above-mentioned Japanese Unexamined Patent Publication (Kokai) No. 53-45376, the desired film having a good appearance cannot be obtained at the melting point thereof or more because the molten resin adheres to the compression roller.

Furthermore, the present inventors have proposed in Japanese Unexamined Patent Publication (Kokai) No. 59-227420, as an improved method for producing a film of an ultra-high-molecular-weight polyethylene that the ultra-high-molecular-weight polyethylene is mixed with a large amount of a plasticizer, followed by extruding the mixture to produce a biaxially oriented film. Although the resultant biaxially oriented film has extremely excellent mechanical strength such as tensile strength, impact strength, etc., the permeability thereof to water vapor is larger than that of conventional polyethylene film. Thus, the application in usage thereof is naturally limited.

SUMMARY OF THE INVENTION

Accordingly, the objects of the present invention are to eliminate the above-mentioned disadvantages of the prior art and to provide a continuous production of an inflation film of ultra-high-molecular-weight polyethylene.

Another object of the present invention is to provide an apparatus capable of producing an inflation film of ultra-high-molecular-weight polyethylene.

Other objects and advantages of the present invention will be apparent from the following description.

In accordance with the present invention, there is provided an inflation film of ultra-high-molecular-weight polyethylene having an intrinsic viscosity $[\eta]$ of at least 5 dl/g, a tensile strength at break of at least 800 kg/cm$^2$ in a machine direction and at least 700 kg/cm$^2$ in a transverse direction, an impact strength of at least 5000 kg·cm/cm, a permeability to water vapor of less than 0.45 g·mm/m$^2$·24 hr, a shrinkage factor in a transverse direction at 130° C. of 10% or more, and a thickness of 10 to 1000 μm.

In accordance with the present invention, there is also provided a method for producing an inflation film of ultra-high-molecular-weight polyethylene comprising the steps of:

melting the ultra-high-molecular-weight polyethylene having an intrinsic viscosity $[\eta]$ of at least 5 dl/g in a screw extruder;

melt extruding the molten ultra-high-molecular-weight polyethylene from a tube die having an L/D of at least 5 provided at a mandrel rotatable with the rotation of the screw; and inflating the molten film in the form of a tube by blowing a gas into the inside of the film at an inflation ratio of 1.1 to 20, followed by cooling to thereby form the inflation film.

In accordance with the present invention, there is further provided an apparatus for producing an inflation film of ultra-high-molecular-weight polyethylene comprising, in sequence from an extruder side:

an extruder provided with a grooved cylinder and a screw having a compression ratio of 1 to 2.5;

a tube die connected to the screw tip, said die having an L/D of at least 5, a ratio $S_1/S_2$ of a cross-sectional area $S_1$ of the inlet portion of the die to a cross-sectional area $S_2$ of the intermediate portion of the die of 0.5 to 3.0, and a ratio $S_2/S_3$ of a cross-sectional area $S_2$ to a cross-sectional area $S_3$ of the outlet portion of the die of 1.0 to 3.0; and a gas feed pipe extending through the inside of the screw and the inside of the mandrel of the tube die.

BRIEF DESCRIPTION OF THE DRAWINGS

The present invention will be better understood from the description set forth below with reference to the accompanying drawing of FIG. 1, which schematically illustrates a cross section of a typical embodiment of an apparatus for producing an inflation film from an ultra-high-molecular-weight polyethylene.

DESCRIPTION OF THE PREFERRED EMBODIMENTS

Figure 1:
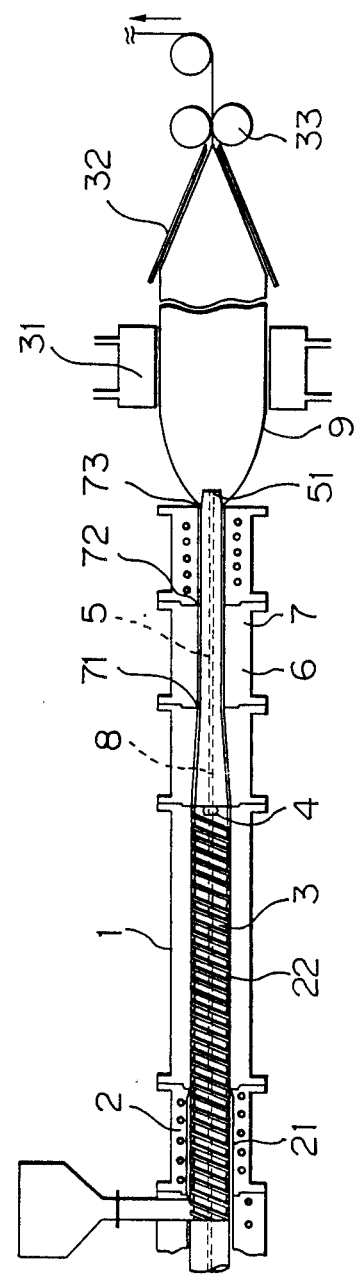

According to the present invention, the desired inflation film can be produced from an ultra-high-molecular-weight polyethylene.

The ultra-high-molecular-weight polyethylenes usable in the present invention are crystalline ethylene homopolymer or crystalline ethylene-alpha-olefin copolymers having a major content of ethylene (e.g., an ethylene content of about 95 to about 100 mol %) having an intrinsic viscosity $[\eta]$, determined at 135° C. in a decalin solvent, of 5 dl/g or more, preferably 5 to 25 dl/g, and more preferably 8 to 25 dl/g, and a melt flow rate (MFR), determined according to an ASTM D-1238(F) method, of less than 0.01 g/10 min. Examples of the alpha-olefin comonomers are those having 3 to 20 carbon atoms, such as propylene, 1-butene, 1-hexene, 1-octene, and 4-methyl-1-pentene. The melt flow rate (MFR) of these ultra-high-molecular-weight polyethylenes is, as mentioned above, still far less than 1.0 even when the melt flow rate is determined according to the condition F of ASTM D-1238 in which a load of 21.6 kg is used and, therefore, the melt flow rate cannot be determined under the conventional determination condition E.

According to the present invention, the inflation film of ultra-high-molecular-weight polyethylene can be prepared from the ultra-high-molecular-weight polyethylene as mentioned below. The resultant inflation films have an intrinsic viscosity $[\eta]$ of 5 dl/g or more, preferably 8 to 25 dl/g; a tensile strength at break in a machine direction (i.e., "TS-M") of 800 kg/cm$^2$ or more, preferably 900 kg/cm$^2$ or more, and more preferably 1000 kg/cm$^2$ or more and a tensile strength at break in a transverse direction (i.e., "TS-T") of 700 kg/cm$^2$ or more, preferably 800 kg/cm$^2$ or more, determined according to a Japanese Industrial Standards (JIS) K-6781 method; an impact strength of 5000 kg·cm/cm or more, preferably 7000 kg·cm/cm or more, and more preferably 8000 kg·cm/cm or more, determined according to ASTM-D-3420 method; a permeability to water vapor of less than 0.45 g·mm/m$^2$·24 hr, preferably 0.40 g·mm/m$^2$·24 hr, determined at a temperature of 40° C. and a relative humidity of 90% according to a JIS-Z-208 method; a shrinkage factor in a transverse direction at 130° C. of 10% or more, preferably 50% or more, and a thickness of 10 to 1000 μm, preferably 10 to 500 μm. The films according to the present invention can be any size depending upon the usage thereof.

When the intrinsic viscosity $[\eta]$ is less than 5 dl/g, the mechanical strengths such as the tensile strength at break and impact strength are not satisfactory from the practical viewpoint and, the films are softened and cannot maintain their shapes so that they cannot be used as a shrink film. Although there are no critical limitations to the upper limit of the intrinsic viscosity $[\eta]$, an intrinsic viscosity $[\eta]$ of more than 25 dl/g tends to result in poor extrudability due to the too high melt viscosity of the ultra-high-molecular-weight polyethylene.

As mentioned above, according to the present invention, the inflation film of the ultra-high-molecular-weight polyethylene can be produced by (i) melting the ultra-high-molecular-weight polyethylene having an intrinsic viscosity $[\eta]$ of at least 5 dl/g in a screw extruder, preferably provided with a grooved cylinder (or barrel), (ii) melt extruding the molten ultra-high-molecular-weight polyethylene from a tube die having an L/D of at least 5, preferably 10 or more, more preferably 20 to 70, provided at a mandrel rotatable with the rotation of the screw; and (iii) inflating the molten film in the form of a tube by blowing a gas into the inside of the film at an inflation ratio of 1.1 to 20, preferably 1.5 to 12, followed by cooling to thereby form the inflation film.

When the intrinsic viscosity $[\eta]$ is less than 5 dl/g, torsion is caused due to the co-rotation of the molten polyethylene and the mandrel in the tube die during the extrusion molding, and non-uniformity in the wall section is likely to be caused due to the deflection of the mandrel. Thus, the moldability is poor and a uniform film is difficult to obtain.

When the L/D of the tube die is less than 5, the ultra-high-molecular-weight polyethylene is not completely uniformly fused before being extruded from the die, since the molten polyethylene is a rubber-like mass unlike the molten product of conventional polyethylene and, therefore, the desired good films cannot be obtained since the tube is not uniformly inflated or is fractured when an inflation gas is blown into the inside of the film in the form of a tube extruded from the tube die. On the other hand, although there is no upper limit to the L/D of the tube die, the practically preferable upper limit of the L/D is 70 or less. Furthermore, the L/D of the tube die is correlated to productivity. That is, the production rate is increased with the increase in the L/D.

The mandrel of the tube die used in the present invention must be rotated with the rotation of the screw of the extruder. There is no limitation to the rotation speed of the mandrel, which is not necessarily the same as that of the screw, in the present invention. The object of the present invention may be accomplished only if the mandrel is rotated. The preferable rotation speed of the mandrel is about 3 to 50 rpm, more preferably about 10 to 40 rpm. When the mandrel is not rotated, the mandrel becomes eccentric so that the film in the form of a tube having a uniform thickness cannot be obtained. The mandrel can be attached to the screw tip in any conventional manner. For example, the mandrel may be directly fixed, screwed, fitted, or inserted into the screw tip, or may be attached by means of an appropriate joint. However, it is convenient to directly screw the mandrel to the screw tip, from the standpoint of disassembling and cleaning the tube die and changing the inner diameter size, because in that way the mandrel is easily attached to and removed from the screw tip.

When the inflation ratio of the film in the form of a tube extruded from the tube die is smaller than 1.1, the inflation film having a thickness of 200 μm or less cannot be obtained and the mechanical properties such as tensile strength at break, impact strength, and tear strength cannot be increased, since the crystals oriented in the transverse direction are small. Furthermore, the properties or characteristics required as a shrink film cannot be obtained. Contrary to this, when the inflation ratio of the film is larger than 20, the inflation film is whitened and fractures occur. Thus, the maximum inflation ratio is 20. The term "inflation ratio" herein used means a ratio of the circumference length of the tube at the outlet of the tube die to the circumference length of the inflated tube.

The gas blown into the inside of the film in the form of a tube is generally air, but nitrogen or other inert gases also can be used.

The inflated films are outwardly cooled by means of an air ring provided with a blower uniformly blowing air or by means of a water-cooling type or air-cooling type cooling ring brought into close contact with the film.

The film after cooling is treated in a conventional manner. For example, the film is gradually folded by means of a stabilizing plate and two sheets of the film are then combined by pinch rolls to form flat films, followed by winding the films with a winder.

According to the present invention, there are no critical limitations to the extrusion molding temperature of the ultra-high-molecular-weight polyethylene, as long as the temperature is higher than the melting point of the polyethylene but lower than 350° C., preferably a temperature of 140° C. to 330° C. When the extrusion temperature is less than the melting point, the resin is likely to clog the die, possibly causing the destruction of the apparatus. The preferable extrusion temperature conditions of the above-mentioned ultra-high-molecular-weight polyethylene are an extruder temperature of 200° C. to 330° C., a temperature between the inlet and the intermediate portion of the tube die of 180° C. to 310° C., and temperatures between the intermediate portion and the outlet of the tube die of 136° C. to 170° C., are used since this prevents unpreferable land melt fractures from occurring in the tube die.

A typical embodiment of the apparatus suitable for use in the production of inflation films from the above-mentioned ultra-high-molecular-weight polyethylene will be explained in detail with reference to the accompanying drawing.

As illustrated in FIG. 1, the apparatus for the production of inflation films from the ultra-high-molecular-weight polyethylene comprises, in sequence from the extruder side, (i) an extruder 1 provided with a grooved cylinder 2 and a screw 3 having a compression ratio of 1 to 2.5, preferably 1.3 to 1.8; (ii) a tube die composed of a mandrel 5 connected to the screw tip 4 in such a manner that the mandrel is rotatable with the rotation of the screw and an outer die 6, the tube die having an L/D of at least 5, preferably at least 10, and more preferably, 20 to 70, a ratio $S_1/S_2$ of a cross-sectional area $S_1$ of the inlet portion 71 of the tube die 7 to a cross-sectional area $S_2$ of the intermediate portion 72 of the tube die 7 of 0.5 to 3.0, preferably 1.0 to 2.0, and a ratio $S_2/S_3$ of a cross-sectional area $S_2$ of the intermediate portion of the tube die 7 to a cross-sectional area $S_3$ of the resin flow path at the outlet portion of the tube die 7 of 1.0 to 3.0, preferably 1.1 to 2.0; and (iii) a gas feed pipe extending through the inside of the screw 3 and the inside of the mandrel 5 of the tube die.

The grooved cylinder 2 is provided with groove portions 21 to ensure a stable feed of the powder particles of the ultra-high-molecular-weight polyethylene to a compression zone 22. As mentioned above, the compression ratio of the screw 3 should be within the range of 1 to 2.5. When the compression ratio of the screw 3 is less than 1.0, the compression stress of the polyethylene against the cylinder wall is small, so that the extrusion amount becomes unstable and the resultant extruded films will have a poor appearance due to surging or insufficient deaeration. Contrary to this, when the compression ratio of the screw 3 is more than 2.5, the resin temperature is abnormally increased due to clogging and the generation of frictional heat in the compression zone, so that the mechanical strength of the extruded films tends to be impaired due to a decrease in the molecular weight of the polyethylene caused by thermal decomposition.

The term "compression ratio" of the screw 3 used herein is defined by a ratio of the groove depth at the hopper portion of the screw 3 to the groove depth at the screw tip.

Although the mandrel 5 is screwed to the tip of the screw 3 in the embodiment shown in FIG. 1, the mandrel may be directly fixed, fitted, or inserted into the screw tip, as mentioned above.

As mentioned above, the L/D of the tube die should be 5 or more. If the L/D of the tube die is less than 5, good inflation film cannot be obtained because the molten resin is not completely fused. The L/D of the tube die is defined by a ratio of the length between the inlet portion 71 of the tube die and the outlet portion 73 of the tube die to the inner diameter of the outer die 6 of the tube die outlet 73. Also, as mentioned above, the ratio $S_1/S_2$ should be within the range of 0.5 to 3.0. Furthermore, as mentioned above, the ratio $S_2/S_3$ should be within the range of 1.0 to 3.0. When the ratio $S_2/S_3$ is less than 1.0, the molten resin is not completely fused. Contrary to this, when the ratio $S_2/S_3$ is more than 3.0, the desired extrusion molding of inflation films becomes difficult due an excessive increase in the resin pressure.

As mentioned above, the cross-sectional area of the flow path of the tube die becomes basically narrower in the direction of the outlet of the tube die. That is, a so-called tapered die is generally used. However, the tip portion of the tube die is preferably such that the cross-sectional area of the path flow is not changed (i.e., so-called straight) since a high dimensional accuracy can be retained. The L/D of the straight portion is preferably within the range of from 5 to 10.

In addition, the tip 51 of the mandrel 5 is preferably elongated externally from the outer die 6 because possible jetting of the extruded molten resin is preferably corrected. In the inside of the screw 3 and the inside of the mandrel 5 of the tube die, the gas feed pipe 8 is extended to pressurize the inside of the film in the form of a tube extruded from the tube die.

The apparatus for producing the inflation film from the ultra-high-molecular-weight according to the present invention is provided with, in addition to the above-mentioned construction elements, a cooling ring 31 for cooling the inflation film 9 having a thickness of 10 to 1000 μm inflated at an inflation ratio of 1.1 to 20 by an inflating gas such as air fed through the gas feed pipe 8, a stabilizing plate 32 for taking-off the folded film after cooling, pinch rolls 33, a take-off mechanism (not shown), and any conventional devices generally provided at an inflation molding machine.

According to the present invention, the inflation film can be produced from the ultra-high-molecular-weight polyethylene at a high productivity when compared with those obtained by conventional press processes and skived film obtained by peeling thin layers from rods. Furthermore, the inflation film of ultra-highmolecular-weight polyethylene having, in addition to the characteristics such as self-lubricating properties, abrasion resistance, and chemical resistance of the conventional film of ultra-high-molecular-weight polyethylene, excellent mechanical properties, for example, a TS-M of 800 kg/cm$^2$ or more, a TS-T of 700 kg/cm$^2$ or more, an impact strength of 5000 kg·cm/cm or more, and an excellent permeability to water vapor of less than 0.45 g·mm/m$^2$·24 hr.

Of the inflation films according to the present invention, those having a tear strength in a machine direction of 10 kg/cm or more, preferably 30 kg/cm or more and a tear strength in a transverse direction of 50 kg/cm or more, preferably 150 kg/cm or more and having a shrinkage factor in a transverse direction of 10% or more, preferably 50% or more can be utilized in wide applications due to their excellent characteristics.

The inflation film of ultra-high-molecular-weight polyethylene has the above-mentioned excellent characteristics, and can be suitably used in various fields, such as liners of cassette tapes; lining material for discharging lines of, for example, chutes, siloes, and hoppers; shrink films for packaging or wrapping rolls, pipes, and steel pipes; bags for low-temperature storage; wrapping films for food products, and wrapping bags, as well as wrapping tapes, after slitting the inflation films, and raw filaments for high tenacity stretched filaments.

Furthermore, the desired inflation films of ultra-high-molecular-weight polyethylene having the abovementioned characteristics, which are difficult to produce in the prior art, can be stably produced by using the method and apparatus according to the present invention.

EXAMPLES

The present invention will now be further illustrated by, but is by no means limited to, the following Examples.

EXAMPLE 1

An inflation film of ultra-high-molecular-weight polyethylene was produced by using an apparatus for producing an inflation film as illustrated in FIG. 1. The specifications of the apparatus used are as follows.

| Screw: | Outer diameter = 30 mm$\phi$ |
| --- | --- |
| | Effective screw length (L/D) = 34 |
| | Flight pitch = 20 mm (constant) |
| | Compression ratio = 1.8 |
| | Adapter length = 200 mm |
| Tube die: | Length = 550 mm |
| | L/D = 25 |
| | Inner diameter of outer die at die outlet = 22 mm$\phi$ |
| | Outer diameter of mandrel at die outlet = 18 mm$\phi$ |
| | S$_1$/S$_2$ = 1.40 |
| | S$_2$/S$_3$ = 1.57 |
| Gas feed pipe: | 6 mm$\phi$, extending through inside of screw and inside of mandrel of tube die |
| Cooling ring: | Inner diameter = 66 mm$\phi$ |
| Other devices: | Stabilizing plate, Pinch rolls, and Film winder |

The ultra-high-molecular-weight polyethylene used in Example 1 was Hizex ® Million 240M available from Mitsui Petrochemical Industries, Ltd., having an intrinsic viscosity [η] of 16.5 dl/g (M.W.=abut 2,400,000), an MFR of less than 0.01 g/10 min, a melting point of 136° C., and a bulk density of 0.45 g/cm$^3$.

The ultra-high-molecular-weight polyethylene was extruded from the above-specified extruder under the following conditions:

Setting temperature
 Extruder=280° C.
 Adapter (AD)=270° C.
 Die base (D$_1$)=180° C.
 Die tip (D$_2$)=150° C.
Screw revolution speed=15 rpm While the extruded tube was taken-off by means of the pinch rolls at a rate of 1.2 m/min, compressed air was blown into the inside of the tube from the 6 mm$\phi$ gas feed pipe extending through the inside of the screw and the inside of the mandrel of the tube die at an inflation ratio of 3 in such a manner that the inflated tube was brought into contact with a cooling ring having an inner diameter of 66 mm$\phi$. Thus, the desired inflation film having a folded width of 104 mm and a thickness of 200 μm was obtained.

The physical properties of the resultant inflation film were determined according to the following methods.

The results are shown in Table 1.

| Tensile test: | Test specimen shape JIS K 6781 |
| --- | --- |
| | Chuck distance 86 mm |
| | Stress rate 200 mm/min |
| | Temperature 23° C. |
| | TS-M and TS-T (kg/cm$^2$) were determined under the above-mentioned conditions. |

Impact strength (kg·cm/cm): Impact strength was determined according to an ASTM D-3420 method (A) except that the diameter of test film was 50 mm. Film Impact Testor available from Toyo Seiki K.K. was used under the conditions of capacity of 30 kg·cm and impact head sphere 1 inch $\phi$. Tear strength (kg/cm): Tear strength was determined according to an ASTM D-689-79 method (corresponding to a TAPPI T-414 method) by using Elmendorf type tearing testor available from Toyo Seiki K.K. Heat shrinkability: The specimen was heated in an oven at a temperature of 130° C. for one hour, followed by being allowed to cool at a temperature of 23° C. for 24 hours. The heat shrinkability was calculated as follows:

$$\text{Heat shrinkability (\%)} = \frac{\left(\begin{array}{c}\text{Dimension}\\\text{after heating}\end{array}\right) - \left(\begin{array}{c}\text{Dimension}\\\text{after heating}\end{array}\right)}{\text{Dimension before heating}} \times 100$$

Permeability to water vapor: Permeability degree (g/m$^2$·24 hr) was determined according to a JIS Z-0208 method at 40° C. and 90% R.H. and the result was divided by 1/thickness (mm) to obtain permeability (g·mm/m$^2$·24 hr)

EXAMPLE 2

An inflation film of ultra-high-molecular-weight polyethylene was produced by using an apparatus for producing an inflation film as illustrated in FIG. 1. The specifications of the apparatus used are as follows:

| Screw: | Outer diameter = 20 mm$\phi$ |
| --- | --- |

-continued

|  | |
|---|---|
| Tube die: | Effective screw length (L/D) = 22<br>Flight pitch = 12 mm (constant)<br>Compression ratio = 1.8<br>Adapter length = 90 mm<br>Length = 240 mm<br>L/D = 40<br>Inner diameter of outer die at die outlet = 6 mm$\phi$<br>Outer diameter of mandrel at die outlet = 5 mm$\phi$<br>$S_1/S_2$ = 1.52<br>$S_2/S_3$ = 1.17 |

Gas feed pipe: 2.5 mm$\phi$, extending through inside of screw and inside of mandrel of tube die
Cooling ring: Inner diameter=20 mm
Other devices: Stabilizing plate, pinch rolls, and film winder The ultra-high-molecular-weight polyethylene used in Example 1 was extruded from the above-mentioned extruder under the following conditions:
Setting temperature
Extruder=290° C.
Adapter (AD)=290° C.
Die base ($D_1$)=170° C.
Die tip ($D_2$)=150° C.
Screw revolution speed=13 rpm While the extruded tube was taken-off by means of the pinch rolls at a rate of 0.6 m/min, compressed air was blown into the inside of the tube from the 2.5 mm$\phi$ gas feed pipe extending through the inside of the screw and the inside of the mandrel of the tube die at an inflation ratio of 3.3 in such a manner that the inflated tube was brought into contact with the cooling ring having an inner diameter of 20 mm$\phi$. Thus, the desired inflation film having a folded width of 31 mm and a thickness of 75 $\mu$m was obtained.

The results are shown in Table 1.

COMPARATIVE EXAMPLE 1

A film of the ultra-high-molecular-weight polyethylene having a thickness of 260 $\mu$m was produced in the same manner as in Example 2, except that the inflation ratio was 1.0.

The results are shown in Table 1.

EXAMPLE 3

An inflation film of the ultra-high-molecular-weight polyethylene having a thickness of 200 $\mu$m, was produced in the same manner as in Example 2, except that the inflation ratio was 1.2.

EXAMPLE 4

A film of the ultra-high-molecular-weight polyethylene having a thickness of 20 $\mu$m was produced in the same manner as in Example 1, except that the extruded tube was taken-off by means of the pinch rolls at a rate of 2.0 m/min and the tube inflated at an inflation ratio of 10 was brought into contact with the cooling ring having an inner diameter of 220 mm$\phi$.

The results are shown in Table 1.

COMPARATIVE EXAMPLE 2

A commercially-available high-density polyethylene film having an intrinsic viscosity [$\eta$] of 3.5 dl/g, an MFR of 0.3, determined according to an ASTM-D-1238 (E), a density of 0.950 g/cm$^3$, and a thickness of 20 $\mu$m was evaluated.

The results are shown in Table 1.

TABLE 1

| | Unit | Direction | Example 1 | Example 2 | Comparative Example 1 | Example 3 | Example 4 | Comparative Example 2 |
|---|---|---|---|---|---|---|---|---|
| Inflation ratio | times | — | 3.0 | 3.0 | 1.0 | 1.2 | 10 | — |
| Thickness | $\mu$m | — | 200 | 50 | 250 | 200 | 20 | 20 |
| Tensile strength at break | kg/cm$^2$ | MD | 950 | 1450 | 710 | 1020 | 1660 | 720 |
| | | TD | 820 | 1100 | 540 | 910 | 1600 | 650 |
| Impact strength | kg · cm/cm | — | 5500 | 9500 | — | — | 7100 | 4800 |
| Tear strength | kg/cm | MD | 85 | 80 | — | — | 5.9 | 5.1 |
| | | TD | 160 | 175 | — | — | 2.2 | 149 |
| Heat shrinkability | % | TD | 75 | 130 | 5 | 15 | 32 | Not detectable due to melting |
| Permeability to water vapor | g · mm/m$^2$ · 24 hr | — | 0.37 | 0.34 | 0.38 | 0.37 | 0.36 | 0.39 |

We claim:

1. An inflation film of ultra-high-molecular-weight polyethylene, consisting essentially of ultra-high-molecular-weight polyethylene and having an intrinsic viscosity of at least 8 dl/g, a tensile strength at break of 800 to 1660 kg/cm$^2$ in a machine direction and 700 to 1600 kg/cm$^2$ in a transverse direction, an impact strength of 5000 to 9500 kg cm/cm, a permeability to water vapor of less than 0.45 g mm/m$^2$ 24 hr, a shrinkage factor in the transverse direction at 130° of 10% to 130%, and a thickness of 10 to 1000 $\mu$m.

2. An inflation film as claimed in claim 1, wherein said film has a shrinkage factor in a transverse direction at 130° C. of 50 to 130%.

3. An inflation film as claimed in claim 1, wherein said film has an intrinsic viscosity of 8 to 25 dl/g, a tensile strength at break of 900 to 1660 kg/cm$^2$ in a machine direction, a tensile strength at break of 800 to 1600 kg/cm$^2$ in transverse direction, an impact strength of 5000 to 9500 kg cm/cm, a permeability to water vapor of less than 0.45 g mm/m$^2$ 24 hr, a shrinkage factor in a transverse direction at 130° C. of 10% to 130%, and a thickness of 10 to 500 $\mu$m.

* * * * *